United States Patent [19]

Sendelweck

[11] Patent Number: 4,963,979
[45] Date of Patent: Oct. 16, 1990

[54] TELEVISION RECEIVER WITH AUXILIARY INPUT CONNECTOR FOR VIDEO SIGNALS OF A SEPARATED Y-C FORMAT

[75] Inventor: Gene K. Sendelweck, Indianapolis, Ind.

[73] Assignee: RCA Licensing Corporation, Princeton, N.J.

[21] Appl. No.: 340,942

[22] Filed: Apr. 20, 1989

[51] Int. Cl.$^5$ .............................................. H04N 5/445
[52] U.S. Cl. .................... 358/37; 358/21 R; 358/22
[58] Field of Search ................. 358/21 R, 22, 37, 181, 358/188

[56] References Cited

U.S. PATENT DOCUMENTS

| | | | |
|---|---|---|---|
| 4,466,016 | 8/1984 | Pritchard | 358/40 |
| 4,620,220 | 10/1986 | Naimpalley et al. | 358/21 R |
| 4,644,387 | 2/1987 | Bell et al. | 358/21 R |
| 4,660,073 | 4/1987 | Baumeister | 358/21 R |
| 4,677,462 | 6/1987 | Bell | 358/39 |
| 4,689,663 | 8/1987 | Bell et al. | 358/21 R |

FOREIGN PATENT DOCUMENTS 2134743A 8/1984 United Kingdom ............. 358/21 R

OTHER PUBLICATIONS

"Hitachi S-VHS Digital Hi-Fi Videotape Recorder VT-Z70", pub. by TV GIJUTSU, Aug. 1987, pp. 24–37.
"Sony Introduces 8 mm Hi-Band Products", pub. in TV Digest, vol. 29, No. 7, Feb. 13, 1989, pp. 11–12.

Primary Examiner—James J. Groody
Assistant Examiner—Kim Yen Vu
Attorney, Agent, or Firm—Joseph S. Tripoli; Peter M. Emanuel; Richard G. Coalter

[57] ABSTRACT

An auxiliary video input terminal (S-terminal) couples luminance and chrominance input signals to respective inputs of peaking circuits in the display processor of a receiver. The chrominance input signal is subjected to pre-distortion (de-peaking) to correct for sideband amplitude distortion in the chrominance peaking filter of the receiver thereby preventing color distortion in displayed images. The luminance signal is subjected to additional peaking at a frequency greater than the characteristic peaking frequency of the luminance peaking filter thereby enhancing the sharpness of wideband luminance input signals displayed by the receiver.

8 Claims, 3 Drawing Sheets

TELEVISION RECEIVER WITH AUXILIARY INPUT CONNECTOR FOR VIDEO SIGNALS OF A SEPARATED Y-C FORMAT

FIELD OF THE INVENTION

This invention relates to television receivers and particularly to receivers intended for use with auxiliary signal sources of a type providing separated luminance and chrominance output signals and extended luminance signal bandwidth.

BACKGROUND OF THE INVENTION

Video cassette recorders (VCRs) and combination camera-recorders (camcorders) have been proposed that provide a relatively wideband luminance signal response (e.g., 5 MHz) and which include an output connector (commonly called an "S-terminal") that provides separated luminance and chrominance output signals. An advantage of this new video interconnection format is that one may apply the separated luminance and chrominance signals to the display processing circuits of a television receiver directly without going through the receiver's internal comb filter. Advantageously, this signal format eliminates interference effects such as cross-color and cross-luminance which otherwise could occur if the luminance and chrominance signals were to be combined as a composite video signal for application to the receiver. See, generally, the article "Hitachi S-VHS Digital Hi-Fi Videotape Recorder VT-Z70" published in TV GIJUTSU, August, 1987, at pages 24–37. See also the article "Sony Introduces 8 mm Hi-Band Products" published in TV DIGEST, Vol. 29, No. 7, Feb. 13, 1989.

SUMMARY OF THE INVENTION

It would be desirable to be able to add an auxiliary video input to a conventional receiver for facilitating the display of video input signals of the proposed wideband Y-C format. The problem to which the present invention is addressed is to add Y-C input capability to a conventional receiver without the necessity of making major modifications to the existing receiver signal processing circuitry. The present invention is particularly addressed to enhancing both the sharpness and color fidelity of displayed images.

Television apparatus embodying the invention comprises a display processing section including a chrominance peaking filter, a luminance peaking filter, a processing unit having inputs coupled to receive luminance and chrominance output signals from said filters and having an output coupled to supply a processed signal to a display device. An auxiliary input connector is provided for supplying a luminance input signal and a chrominance input signal of separated form. First and second circuit paths provide coupling of the luminance and chrominance input signals to respective inputs of the peaking filters. Filter means in respective ones of the paths modify selected parameters of the coupled signals for enhancing the sharpness and color fidelity of images displayed by said display device responsive to said luminance and chrominance input signals provided by said auxiliary input connector.

BRIEF DESCRIPTION OF THE DRAWING

The invention is illustrated in the accompanying drawing wherein like elements are denoted by like reference designator and in which.

DETAILED DESCRIPTION

Figure 1:
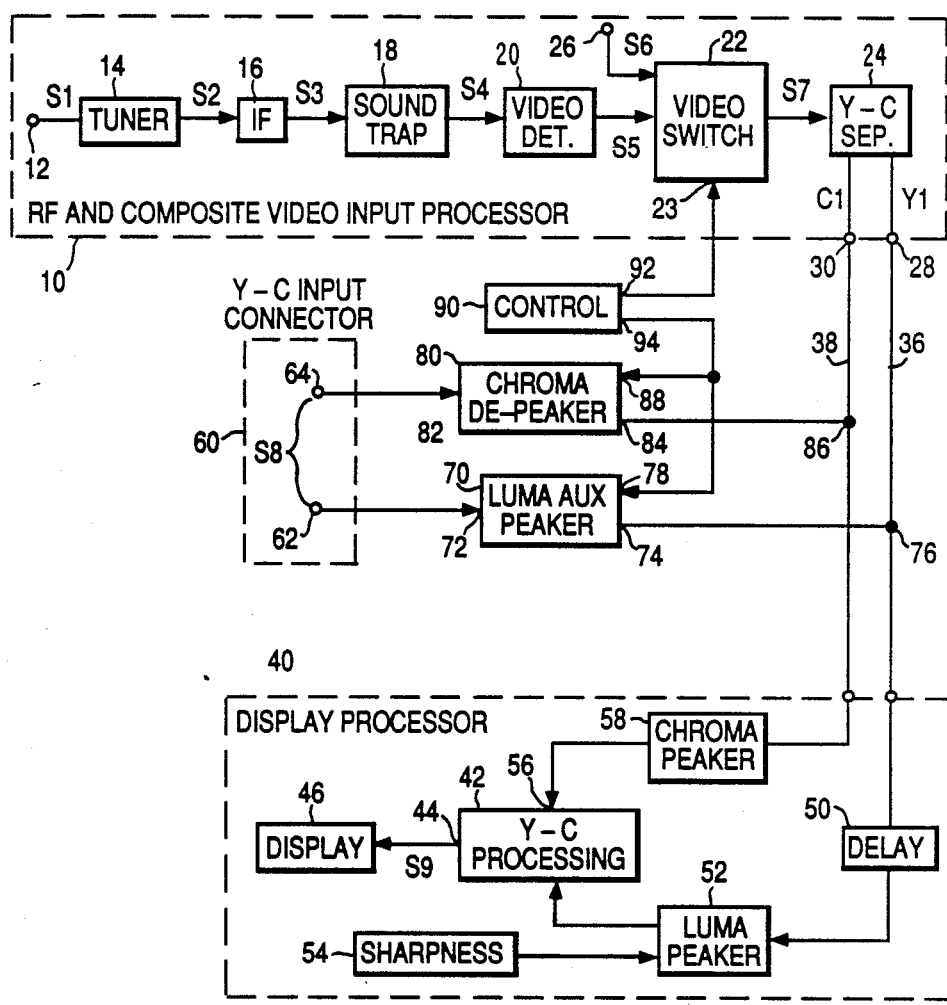
FIG. 1 is a block diagram of a television receiver embodying the invention.

The receiver of FIG. 1 includes an RF and composite video input processor 10 having an antenna input terminal 12 for receiving a standard RF modulated video input signal S1 from sources such as an antenna or cable TV source or from TV accessories such as computers or television games. Signal S1 is applied to a tuner 14 which selects specific channels to be received. The tuner output signal S2 is applied to an intermediate frequency amplifier (IF) unit 16 which amplifies signal S2 and applies the amplified signal S3 to a sound trap 18. The sound trap 18 removes the sound carrier from signal S3 and provides the resultant video signal S4 to a video detector 20 which produces a baseband video output signal S5 which is of composite video form, that is, it comprises a baseband luminance component (Y) and a quadrature modulated chrominance component (C). A video switch 22 selectively applies the composite video signal S5 or an auxiliary baseband composite video signal S6 to a luminance chrominance (Y-C) separation filter 24 (e.g., a comb filter). The auxiliary composite video signal S6 may be provided by an auxiliary input terminal 26 from a source such as a VCR, computer or other suitable device. Filter 24 separates the selected video input signal (S5 or S6) into its luminance (Y1) and chrominance (C1) components which are applied to respective output terminals 28 and 30 of input processor 10.

With the exception of video switch 22, the elements of processor 10 may all be of conventional design. Switch 22 is of unconventional design, however, in that it preferably includes a "37 null" or disabled condition in which neither of the composite video signals S5 and S6 are applied to Y-C separator filter 24. This feature prevents interference with wideband auxiliary video input signals Y2 and C2 when the wideband signals are selected for display as will be explained.

One may select various alternatives for video switch 22 for disabling or interrupting output signals Y1 and C1 from processor 10. As a first example, one may interpose a switch between the output of switch 22 and the input of filter 24 for interrupting or disabling the switch 22 output signal S7. As another example, switches may be interposed between the outputs of filter 24 and output terminals 28 and 30 of processor 10. Still another alternative would be to interpose switches in the conductors carrying the composite video signals S5 and S6. In any case, what is of importance to the present invention is that suitable means be provided for disabling the luminance Y1 and chrominance C1 signals produced by input processor 10 when it is desired to display a wideband video input signal S8 of the separated Y-C format.

The selected luminance (Y1) and chrominance (C1) output signals of input processor 10 at output terminals 28 and 30 are coupled to respective inputs 32 and 34 of a display processor 40 by means of respective conductors 36 and 38. Processor 40 is of conventional design and includes a luminance-chrominance (Y-C) processing unit 42 having an output 44 coupled to supply a processed video signal S9 to a display 46 (e.g., a kinescope). The luminance input terminal 32 is coupled to a luminance input (48) of processor 42 via a luminance signal delay and equalization circuit 50 and a luminance signal peaking circuit 52. A sharpness control 54 is coupled to luminance peaking circuit 52 for controlling the luminance signal peaking amplitude. The chrominance signal input 34 of processor 40 is coupled to the chrominance signal input 56 of Y-C processor 42 via a chrominance signal peaking circuit 58. Processing unit 42 is of conventional design and includes, illustratively, a chrominance signal demodulator (for demodulating the chrominance signal provided by peaking circuit 58), hue and saturation controls and a suitable matrix circuit for combining the luminance input signal with the demodulated color difference components (e.g., R-Y, B-Y) to provide an output color signal S9 in a form (e.g., RGB) suitable for display by display 46.

The remaining elements of FIG. 1 facilitate the display of an auxiliary video input signal S8 of the recently proposed Y-C format in which the luminance Y2 and chrominance C2 components thereof are provided in separate form to receiver and in which the luminance component Y2 exhibits a relatively wide bandwidth (e.g., 5 MHz or so) as compared with broadcast standard video signals. As previously explained, this new wideband Y-C video signal format provides improved resolution (about 400 horizontal lines). Also, since the components Y2 and C2 are of separated form (rather than composite form) undesirable effects such as crosscolor and cross-luma are eliminated. It is herein recognized as being desirable to be able to display the Y-C format video signal S8 without requiring extensive modifications to the receiver and to avoid unnecessary duplication of existing receiver circuits.

In detail, the wideband Y-C format video input signal S8 is applied to a Y-C format video input connector 60 having a first terminal 62 to which the luminance component Y2 of signal S8 is applied and a second terminal 64 to which the chrominance component of signal S8 is applied. The luminance component Y2 at terminal 62 is coupled to the input of luminance peaking circuit 52 in processor 40 by means of a circuit path which includes an auxiliary luminance peaking circuit 70. Specifically, the auxiliary peaking circuit 70 is connected at its input 72 to terminal 62 of connector 60 and at its output terminal 74 to conductor 36 at circuit node 76. By this means the wideband luminance signal Y2 is subjected to peaking by the combination of peaking circuits 52 and 70. The conventional peaking circuit 52 applies peaking over a lower portion of the bandwidth of signal Y2 and peaking circuit 70 applies supplementory peaking to an upper portion of the bandwidth of signal Y2. Accordingly, the wideband luma signal Y2 receives peaking over essentially its full bandwidth without requiring a separate full bandwidth peaking circuit in the receiver.

Figure 2:
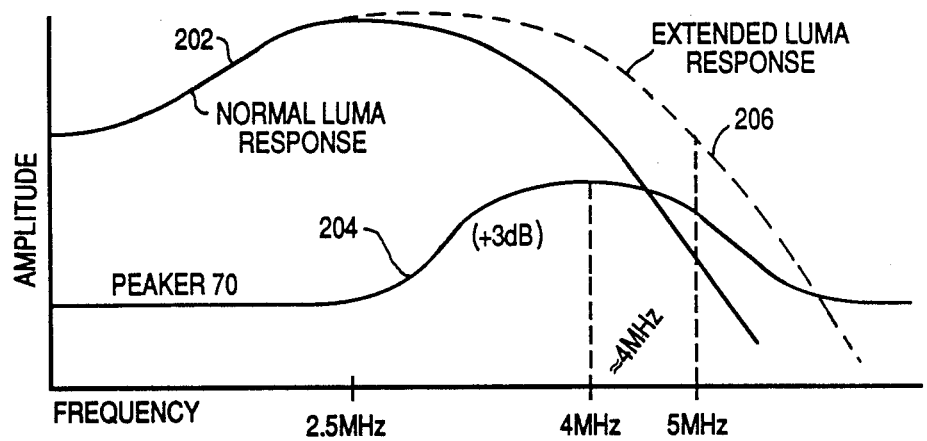
FIG. 2 is a spectrum diagram illustrating certain aspects of luminance signal processing in the receiver of FIG. 1.

Advantageously, this feature of the invention avoids costly and complex circuit duplication in the receiver because peaking circuit 70 only needs to supplement the peaking provided by the conventional receiver peaking circuit 52. FIG. 2 illustrates the effect of this feature. Response curve 202 (solid line) illustrates the amplitude response of the receiver when displaying the standard bandwidth video signal Y1. For this case maximum peaking occurs at a frequency of about 2.5 MHz and the upper band edge is around 4.0 MHz. Curve 204 illustrates the supplementary peaking provided by peaking circuit 70. As shown, about 3 dB of peaking is added at a frequency of about 4 MHz. The effect of doubly peaking the wideband luma signal Y2 is illustrated by the resultant curve 206 (dashed line). As shown, the Y2 signal response is extended to a frequency of about 5 MHz. Advantageously, a relatively small amount of additional peaking at the upper end of the peaking range of the conventional peaking circuit is needed to obtain full bandwidth peaking of the wideband luma signal Y2 and since the standard peaking circuit is used for both the standard bandwidth signal Y1 and the wideband signal Y2 a desirable savings in peaking circuitry is achieved.

An advantage of applying the output of auxiliary peaking circuit 70 to node 76 rather than directly to peaking circuit 52 is that the doubly peaked luma signal Y2 is thereby also delayed by delay and equalization circuit 50. This delay (e.g., a few hundred nanoseconds) compensates for the difference in luminance and chrominance delays due to their different bandwidths so as to achieve proper luminance/chrominance registration on display 46. It has been found that the delay compensation for the standard bandwidth luma signal Y1 is adequate to achieve good registration of luminance and chrominance for the wideband signal and thus needless duplication of circuit elements is avoided by the connection to node 76 to facilitate the sharing of circuit 50.

The chrominance component C2 of Y-C format signal S8 is processed in accordance with an aspect of the invention by coupling input terminal 64 to the input 82 of a chrominance signal pre-distortion or "de-peaking" circuit 80 having an output 84 coupled to a circuit node 86 on conductor 38. An important function of circuit 80 is to unbalance the relative amplitudes of the upper and lower sidebands of the chrominance signal C2. Specifically, the upper sideband is reduced relative to the lower sideband by suitable filtering. The amount of the reduction is selected to be complementary to the reduction of the lower sideband relative to the upper sideband which occurs in chroma peaking circuit 58 in display processor 40 so that after peaking in circuit 58 and de-peaking in circuit 80 the resultant C2 chroma signal at the input of Y-C processor 42 exhibits substantially equal amplitude sidebands. It is important that the chroma sidebands do not become unbalanced because as previously explained processor 42 demodulates them to baseband (R-Y, B-Y) for matrixing with the luma signal and these sideband amplitude errors will cause hue and saturation errors in the matrixed (RGB) output signal.

Figure 3:
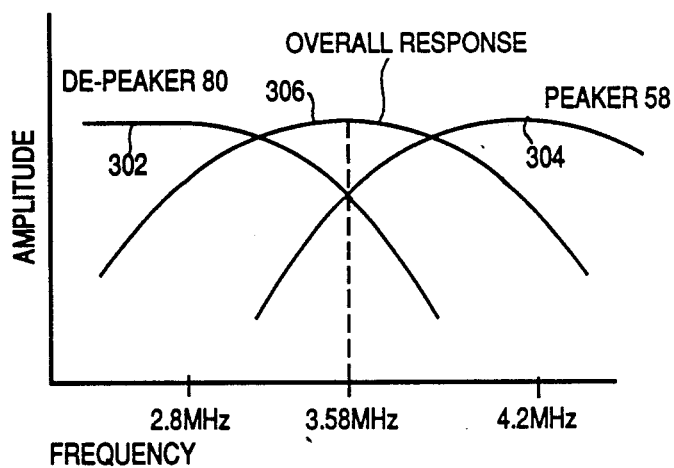
FIG. 3 is a diagram illustrating certain aspects of chrominance signal processing in the receiver of FIG. 1.

The foregoing is illustrated in FIG. 3 in which curve 302 illustrates the chroma de-peaker 80 response, curve 304 illustrates the chroma peaker 58 response and curve 306 illustrates the combined resultant response. As shown, curve 302 peaks at about 700 KHz below the subcarrier frequency (3.58 MHz) and curve 304 peaks at about 700 KHz above the subcarrier frequency. The resultant response 306 peaks at the color subcarrier frequency and is symmetrical thereby ensuring that the relative amplitudes of the upper and lower sidebands of the quadrature modulated color subcarrier signal are not distorted.

It is instructive to note that one reason chroma peaking circuit 58 is present in processor 40 is to correct for sideband distortion of chroma signal C1 which occurs due to the limited IF bandwidth of the input processor 10 or the limited bandwidth of the source coupled to input 26. Since chroma signal C2 in the new Y-C signal format should have equal sidebands one might consider just skipping the peaking circuit 58 when displaying signal C2. This could be done, for example, by connecting chroma input terminal 64 directly to the chroma input 56 of processor 40 and thus eliminating the need for circuit 80. Such an approach would solve the sideband amplitude problem but could create another problem, namely, Y-C mis-registration. Recall that delay 50 corrects for Y-C delay differences due to the different bandwidths involved. For the embodiment of the invention shown, the relative Y-C delay for Y1 and C1 is about the same as for Y2 and C2. Accordingly, the same compensating delay is suitable for both signals. If, however, de-peaker 80 were eliminated and C2 were applied directly to input 56 of processor 42, the C2 delay will be different. This may be corrected, illustratively, by switching the luma signal delay or, alternatively, adding delay to signal C2. Such complications may be completely avoided by passing both chroma signals through peaking circuit 58 and correcting the chroma signal C2 sideband amplitudes by de-peaking in circuit 80 as described.

Selection of signals for display is provided for by a user activated control unit 90 which has an output 92 coupled to a control input 23 of video switch 22 and another output 94 coupled to respective control inputs 88 and 78 of the chrominance and luminance circuits 80 and 70. To display the broadcast or cable antenna input signal S1, the user activates control 90 to send a disabling signal to the control inputs of circuits 80 and 70. This causes these units to open respective series connected output switches thus disconnecting them from conductors 36 and 38. At the same time unit 92 sends an enabling signal to switch 22 for selecting signal S5. This action is the same when auxiliary composite video signal S6 is selected for display except that switch 22 selects signal S6 rather than S5. When displaying the wideband Y-C format signal S8 for display, control unit 90 sends a disabling signal to switch 22 so that neither S5 nor S6 is selected. Simultaneously, an enabling signal is produced at output 94 of unit 90 thereby enabling the internal series switches in circuits 70 and 80 to couple the processed Y2 and C2 signals to conductors 36 and 38 for display by display unit 46.

Figure 4:
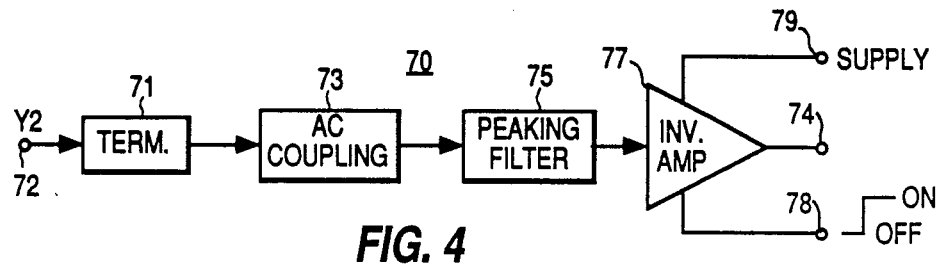
FIG. 4 is a detailed block diagram of an auxiliary luminance peaking circuit used in the receiver of FIG. 1.
Figure 5:
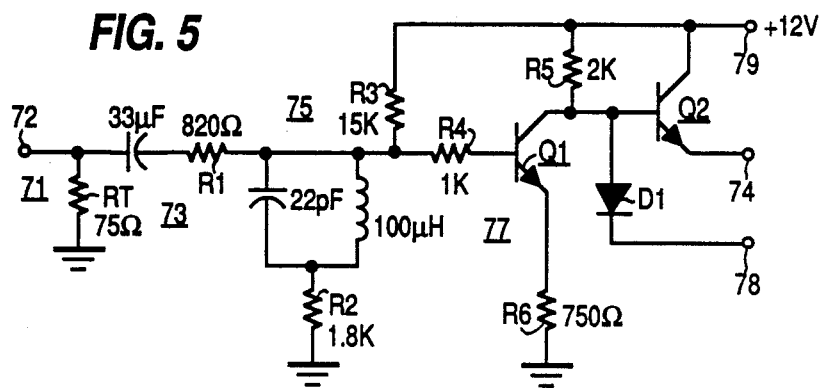
FIG. 5 is a detailed circuit diagram of the circuit of FIG. 4.

FIG. 4 is a detailed block diagram of a preferred embodiment of auxiliary luminance peaking circuit 70 illustrating further features of luminance signal processing. The input terminal 72 is coupled to the output terminal 74 via a cascade connection, in the order named, of a termination network 71, an AC coupling network 73, a peaking filter 75 and a switched amplifier 77 to which there is also connected a supply input terminal 79 and the control input terminal 78. FIG. 5 is exemplary of a specific circuit implementation of FIG. 4 and includes exemplary circuit values.

The termination network 71 of FIG. 4 serves to terminate the luma input cable for signal Y2 in its characteristic impedance to thereby prevent cable reflections which would otherwise appear as double images or "ghosts" when Y2 is displayed. In FIG. 5 this function is provided by resistor RT coupled between input 72 and ground.

The AC coupling network 73 it will be noted is placed before the peaking filter 75 in the cascade connection (71-73-75-77). Advantageously, this prevents the low impedance terminating resistor (75 Ohms) and any DC component if signal Y2 from upsetting the DC bias of amplifier 77 since, as will be explained, peaking filter 75 forms part of the bias network for amplifier 77 thus advantageously reducing the number of components needed to implement the amplifier. Network 73 is implemented, in the example of FIG. 5, by a series coupled capacitor (33 micro-Farads).

The peaking filter 75, as shown and described in connection with FIG. 2, provides a small boost of about 3 dB near the upper end of the video band (around 4 MHz). Any suitable filter may be used for this purpose but the preferred example of FIG. 5 provides a DC path to ground through a resistor R2 and thus is useful in establishing bias for amplifier 77. Specifically, in FIG. 5 filter 75 comprises an input series resistor R1 coupled by a parallel resonant (L-C) circuit and a shunt resistor R2 to ground. The values of the input series resistor R1 and the shunt resistor R2 are the main factors that determine the signal change. At frequencies far below or above resonance, the filter attenuation is approximately $R2/(R1+R2)$ or about 3 dB and at resonance it is about zero dB as shown in FIG. 2.

Advantageously, bias voltage for amplifier 77 is developed in filter 75 by passing a current through the filter inductor and resistor R2. This current is provided by resistor R3 connected to supply terminal 79. The bias so developed is coupled via resistor R4 to amplifier transistor Q1 having collector and emitter resistors (R5 and R6) coupled respectively to supply terminal 79 and ground. The gain of the amplifier is primarily determined by the ratio of resistor R6 and R5 and for the values shown is about times three or 10 dB. Thus, the overall gain change of peaking circuit 70 varies from a minimum of +7 dB to a maximum of +10 dB over the luminance frequency range.

Output signals for amplifier 77 are provided by an emitter follower transistor Q2 connected at the base thereof to the collector of transistor Q1 and at the emitter and collector electrodes thereof to terminals 74 and 79. Switching of the output signal is provided by means of diode D1 connected at the anode and cathode thereof to the base of transistor Q2 and to control terminal 78. A high level voltage at terminal 78 reverse biases diode D1 whereby the amplifier is enabled and Y2 (peaked) is coupled to node 76 on conductor 36 for display by display 46. Conversely, a low level voltage on terminal 78 forward biases diode D1 thereby disabling emitter follower transistor Q2 and thus decoupling the luminance peaking filter 70 from conductor 36. In this mode, as previously explained, video switch 22 selects one of signals S5 or S6 for display by display 46 in processor 40.

Figure 6:
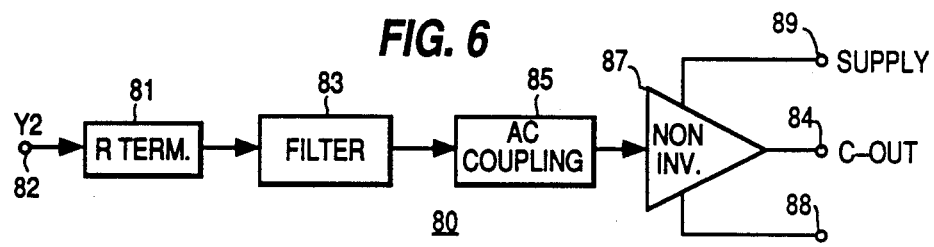
FIG. 6 is a detailed block diagram of a chrominance signal de-peaking or pre-distortion circuit used in the receiver of FIG. 1.
Figure 7:
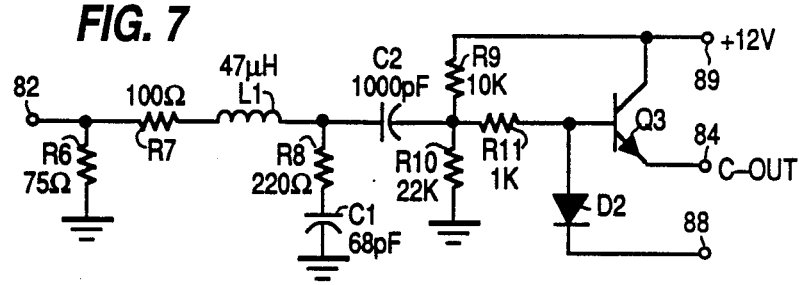
FIG. 7 is a detailed circuit diagram of the chrominance signal pre-distortion circuit of FIG. 6.

FIG. 6 is a detailed block diagram of a preferred embodiment of auxiliary chrominance pre-distortion or "de-peaking" circuit 80 illustrating further features of the chrominance signal processing of the receiver of FIG. 1. The input terminal 82 is coupled to the output terminal 84 by a cascade connection, in the order named, of a termination network 81, a filter 83, an AC coupling network 85 and a switched amplifier 87 to which there is also connected a supply terminal 89 and the control input terminal 88. FIG. 7 is exemplary of a specific circuit implementation of FIG. 6 and includes exemplary circuit values.

The termination network 81 serves to terminate the chrominance signal input cable for signal C2 in its characteristic impedance to thereby prevent cable reflections which would otherwise appear as color distortions when C2 is displayed. In FIG. 7 this function is provided by resistor R6 coupled between terminal 82 and ground.

The filter 83, as discussed with regard to FIG. 3, distorts the relative amplitudes of the chroma signal sidebands by attenuating the upper sideband more than the lower sideband. The degree of attenuation as shown in FIG. 3, is complementary to the response of the peaking filter 58 so that the resultant sidebands are symmetrical as shown by curve 306. For this purpose, one could implement filter 83 with a low-pass or a band-pass filter. In order to provide a good match (i.e., complement) for the chrominance filter 58, it has been found advantageous to include resistors in filter 83 for controlling its response shape (slope) in the chrominance signal band (i.e., plus or minus about 700 KHz from the subcarrier frequency). To this end, the filter 83 includes a series branch comprising inductor L1 and shaping resistor R7 and a shunt branch including capacitor C1 and shaping resistor R8. The inductor and capacitor considered alone provide a low-pass characteristic which, by itself, would exhibit a maximum slope of −12 dB/octove. This is modified by selecting resistors R7 and R8 for filter 83 to match the slope of filter 58 in the region from about 2.8 MHz to about 4.2 MHz.

AC coupling in the chrominance filter 80 is done differently than in the luminance filter 70 in that it follows (rather than precedes) filter 83 in the cascade connection 81-83-85-87. In this case, however, the AC coupling (e.g., capacitor C2) could be placed before the filter since there is no DC path to ground through the shunt path R8-C1. However, if a filter is used for filter 83 which does have a shunt path to ground then one may wish to use this path for biasing amplifier 87 as was done with amplifier 77 in which case the AC coupling would be placed before filter 83.

Amplifier 87 is a switched amplifier which couples and decouples the pre-distorted chrominance signal C2 to conductor 38. As was the case with amplifier 77, the selective coupling could be provided by means of a series switch at the amplifier output. It is preferred, however, to use a switched amplifier to avoid increased output resistance which would result from using a series output switch. By this means, circuit output signal levels are little influenced by the impedance of the conductors 38 and 36 and associated elements connected to them. A specific example of amplifier 87 (FIG. 7) includes a pair of resistors R9, R10 coupled between the output of the coupling capacitor and the supply terminal 89 and ground, respectively. The DC bias so developed and the chrominance signal are coupled via a resistor R11 to the base of an emitter follower transistor Q3 having collector and emitter electrodes connected to respective ones of supply and output terminals 89 and 84. Switching of amplifier 87 is provided by diode D2 connected at the anode and cathode thereof to the base of transistor Q3 and the control terminal 88, respectively. In operation a low level voltage at terminal 88 forward biases diode D2 thereby disabling transistor Q3 and isolating amplifier 87 from conductor 38. Conversely, a high level voltage at terminal 88 reverse biases diode D2 and enables transitor Q3 to supply the pre-distorted chrominance signal C2 to conductor 38.

The principles of luminance peaking and chrominance depeaking herein shown and described may be used either separately or in combination in a specific television receiver application. It has been previously explained in detail, for example, that the chrominance pre-distortion circuit 80 may be eliminated in a given receiver application by coupling C2 input 64 to the chrominance input 56 of display processor 40 by a switch thereby bypassing chroma peaking circuit 58. As explained, the changes in relative delays of the signals C2 and Y2 could be corrected by use of switchable delay circuits for luma signal Y2 or by adding delay in the C2 signal path. In certain applications it may be desired to display the signal Y2 without peaking or to provide a Y2 with a completely separate full bandwidth peaking circuit thus eliminating the need for circuit 70. For example, luminance peaking circuit 70 could be replaced with a switch for selecting Y2 and peaking circuit 52 could be disabled when displaying signal Y2. This would provide "flat" (unpeaked) luminance response but the benefits of chroma de-peaking would still be obtained since it facilitates proper Y2-C2 registration as previously explained. Yet another alternative would be to replace circuit 70 with a full bandwidth peaker and switch and to disable peaker 52 when displaying Y2 thereby giving independent peaking control of Y1 and Y2. Again, the Y2-C2 registration advantages are still obtained in this example of dispensing with circuit 70. The advantages of employing the combination of luminance supplementary peaking (70) and chrominance pre-distortion (80) have been previously discussed.

What is claimed is:

1. Television apparatus, comprising:
   a display processing section including a chrominance peaking filter, a luminance peaking filter, a processing unit having inputs coupled to receive luminance and chrominance output signals from said filters and having an output coupled to supply a processed signal to a display device;
   a video signal source having first and second outputs coupled via first and second circuit paths to supply first luminance and first chrominance input signals to respective inputs of said peaking filters;
   an auxiliary input connector having first and second terminals for separately providing a second luminance input signal and a second chrominance input signal;
   third and fourth circuit paths for coupling said second luminance input signal and said second chrominance input signal to respective inputs of said peaking filters;
   a first video signal amplitude modifier connected to said luminance peaking filter for modifying a parameter of said second luminance input signal supplied to said display processing section via said third path; and
   a second video signal amplitude modifier connected to said chrominance peaking filter for modifying a parameter of said second chrominance input signal supplied to said display processing section via said fourth path.

2. Television apparatus comprising:

a display processing section including a chrominance peaking filter, a luminance peaking filter, a processing unit having inputs coupled to receive luminance and chrominance output signals from said filters and having an output coupled to supply a processed signal to a display device;

an auxiliary input connector for separately providing a luminance input signal and a chrominance input signal;

first and second circuit paths for coupling said luminance and chrominance input signals to respective inputs of said peaking filters; and filter means in respective ones of the paths for modifying selected parameters of the coupled signals for enhancing the sharpness and color fidelity of images displayed by said display device in response to said luminance and chrominance input signals provided by said auxiliary input connector.

3. Apparatus as recited in claim 2 wherein:

said first circuit path includes a further luminance peaking filter and said second circuit path includes a chrominance de-peaking filter.

4. Apparatus as recited in claim 3 wherein said further luminance peaking filter exhibits peaking in a range above the range of peaking provided by the first named luminance peaking filter and said chrominance de-peaking filter provides un-equal attenuation of sidebands of said chrominance input signal.

5. Apparatus as recited in claim 2 wherein said first circuit path includes an auxiliary luminance peaking filter and said second circuit path includes a filter for distorting the relative sideband amplitudes of said chrominance signal.

6. Apparatus as recited in claim 2 wherein:

said first circuit path includes an auxiliary luminance peaking filter in series with a switching circuit and said second circuit path includes a chrominance sideband distortion filter in series with a further switching circuit and means for enabling and disabling said switching circuits.

7. A television receiver comprising an input processing section having an input for receiving an RF video input signal, having a first output providing a baseband luminance output signal and having a second output providing a baseband chrominance output signal;

a display processing section having a luminance peaker coupled via a first circuit path to said first output, having a chrominance peaker coupled via a second circuit path to said chrominance output and having an output coupled to supply a processed video output signal to a display;

a video input connector for providing an auxiliary luminance input signal and an auxiliary chrominance input signal;

first circuit means for coupling said auxiliary luminance signal to said first circuit path and for selectively enhancing a parameter of the coupled luminance signal; and second circuit means for coupling said auxiliary chrominance signal to said second circuit path and for selectively attenuating a parameter of the coupled chrominance signal.

8. Apparatus as recited in claim 7 wherein:

said first circuit path includes an auxiliary high frequency luminance peaking circuit and said second circuit means includes a chrominance signal sideband distortion circuit.

* * * * *